(12) United States Patent
St. Clair

(10) Patent No.: US 6,382,604 B2
(45) Date of Patent: May 7, 2002

(54) METHOD FOR ADJUSTING THE GAIN APPLIED TO A SEAT SUSPENSION CONTROL SIGNAL

(75) Inventor: Kenneth A. St. Clair, Raleigh, NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/848,697

(22) Filed: May 3, 2001

Related U.S. Application Data
(60) Provisional application No. 60/201,709, filed on May 3, 2000.

(51) Int. Cl.$^7$ .............................. F16F 1/00; B62D 33/06
(52) U.S. Cl. ............................. 267/131; 364/424.059; 180/89.15
(58) Field of Search ................ 188/299.1; 267/131; 248/550; 364/424.059; 180/89.13, 89.15; 701/37

(56) References Cited

U.S. PATENT DOCUMENTS

| | | | |
|---|---|---|---|
| 5,276,622 A | | 1/1994 | Miller et al. |
| 5,652,704 A | * | 7/1997 | Catanzarite ............ 364/424.059 |
| 5,779,009 A | * | 7/1998 | Iwasaki .................... 188/299.1 |
| 5,941,920 A | * | 8/1999 | Schubert ........................ 701/37 |
| 5,944,763 A | * | 8/1999 | Iwasaki ........................ 701/37 |
| 6,049,746 A | | 4/2000 | Southward et al. |
| 6,070,681 A | * | 6/2000 | Catanzarite et al. ..... 180/89.15 |

* cited by examiner

Primary Examiner—Christopher P. Schwartz
(74) Attorney, Agent, or Firm—Michael M. Gnibus

(57) ABSTRACT

In a seat suspension system, a method for adjusting the gain applied to a control signal to accommodate for large variations in rider weight and input severity and thereby provide rider comfort over a wider range of conditions than is possible with fixed gains or tunings. The method of the present invention is adaptable to changes in system operating conditions.

13 Claims, 3 Drawing Sheets

METHOD FOR ADJUSTING THE GAIN APPLIED TO A SEAT SUSPENSION CONTROL SIGNAL

CROSS REFERENCE

This application claims the benefit of Provisional Application Serial No. 60/201,709 filed May 3, 2000.

FIELD OF THE INVENTION

The invention generally relates to a method for controlling a means for controlling displacement of a suspended seat, and more particularly the invention relates to a method for controlling a damper in a suspended seat system by calculating the positional power of the system and using the calculated positional power value as a basis for tuning the system operating parameters.

BACKGROUND OF THE INVENTION

In a semi-active seat suspension system the displacement of the seat is controlled by a damper which may be comprised of a damper that includes a volume of a field responsive material such as magnetorheological (MR) material or a servo valve controlled damper, etc. The field responsive material and servo valve controlled dampers serve to quickly modify the motion control forces supplied by the damper or other motion control means in a seat suspension system. During operation of the system, as required, a signal is sent to the damper to modify the supplied damping. Frequently, when large magnitude non-typical inputs are experienced a gain value is applied to the control signal to rapidly increase the magnitude of the control signal, transmitted to the damper and significantly increase the damping forces.

In prior art seat suspension control systems the gain values applied to system control signals or tunings are fixed for a semi-active seat suspension system. The fixed gain and tuning values are established based on the seat manufacturer, the typical seat occupant weights and inputs that are most frequently experienced when the suspension system is used in the its associated field, for example in busses or trucks. The shortcoming associated with systems that apply fixed gain and tuning values to control signals is that such fixed systems frequently can not sufficiently prevent endstop collisions when either non-typical inputs are imparted on the system or when a seat occupant has a weight that is outside of the tuned weight range.

The foregoing illustrates limitations known to exist in present devices and methods. Thus, it is apparent that it would be advantageous to provide an alternative directed to providing variable gain values to a control signal. Accordingly, a suitable alternative is provided including features more fully disclosed hereinafter.

SUMMARY OF THE INVENTION

In one aspect of the invention this is accomplished by providing a method for adjusting the gain applied to a control signal to accommodate for large variations in rider weight and/or input severity and thereby provide rider comfort over a wider range of conditions than is possible with fixed gains or tunings. The method of the present invention is adaptable to changes in system operating conditions.

In another aspect of the invention the method of the present invention serves as a displacement regulator that tends to cause the seat displacement to be constant regardless of the weight of the rider or the magnitude of the input displacements.

In yet another aspect of the invention, the method causes the suspension system damper to produce low magnitude control forces during low severity inputs and low rider weights.

Another useful feature of the system is that as the severity of the inputs increases the normal phase lag between the suspended seat input and the output motions found in passively damped seats is reduced. This has the effect of coupling the driver more strongly to the vehicle controls (steering, brake, etc.) making it easier to control the vehicle in question during large vibratory inputs.

The foregoing and other aspects will become apparent from the following detailed description of the invention when considered in conjunction with the accompanying drawing Figures.

BRIEF DESCRIPTION OF THE DRAWING FIGURES

FIGS. 1a, 1b, and 1c are schematic representations of a seat suspension system that utilizes the semi-active control system of the present invention to limit endstop collisions.

DETAILED DESCRIPTION

Figure 1:
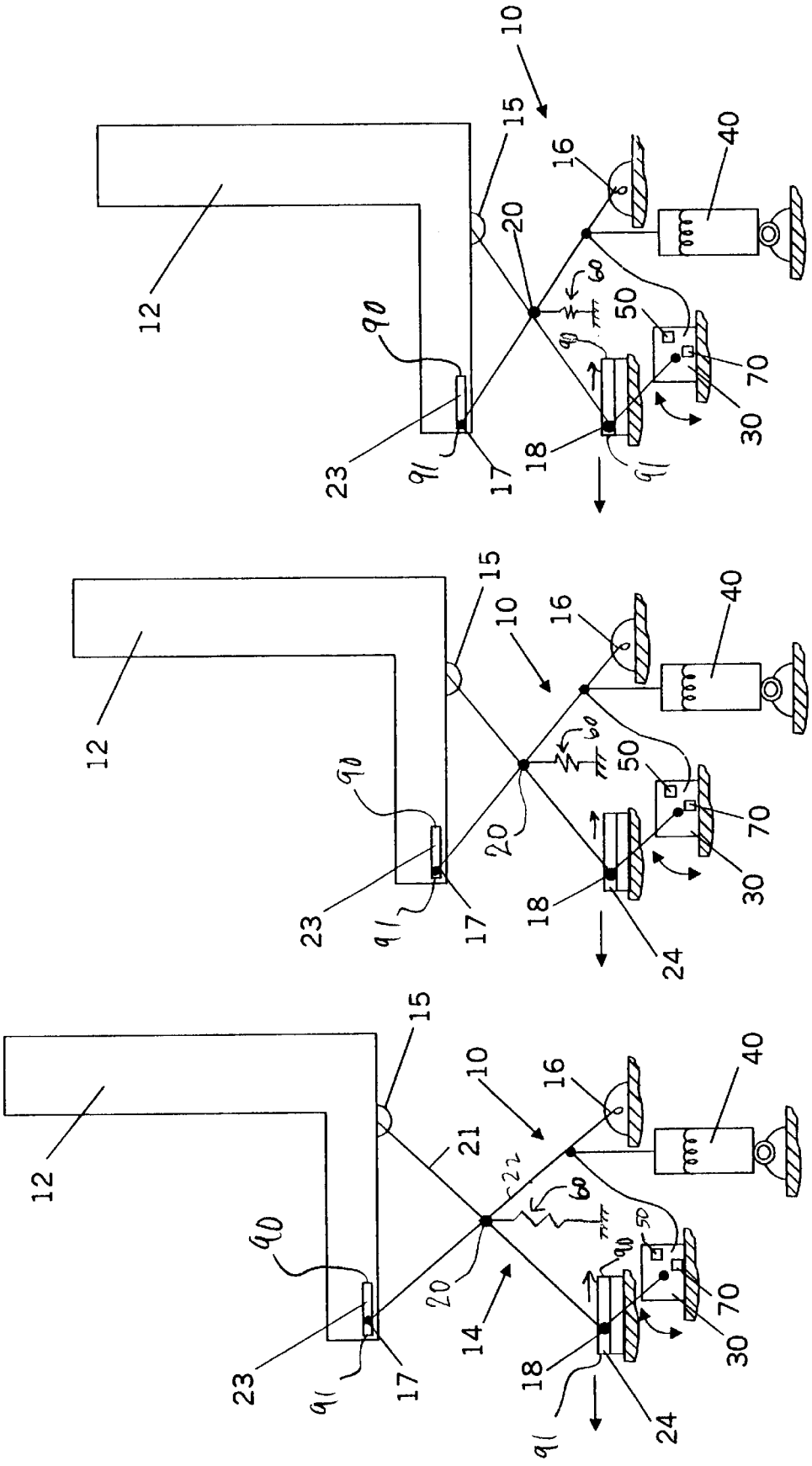

Now turning to the drawings wherein like parts are referred to by the same numbers in the several views, the present invention method most generally relates to a method for adjusting the gain factor applied to control signals in semi-active seat suspensions and the method is represented generally in flowchart representations of FIGS. 2–5. The method of the present invention serves as one means for limiting endstop collisions. As referred to hereinafter the term endstop shall refer to the end of permissible seat displacement. FIGS. 1a, 1b and 1c schematically illustrate a typical seat suspension system 10 adapted for use in combination with the control method of the present invention where the seat is shown at different heights. The present invention, senses the relative seat position which might be a truck seat for example, and adjusts the gain factor applied to the damper control signal by a factor of a position power valve based on the deviation of the relative seat height from the leveled height value. The method of the present invention serves to greatly decrease travel to the endstop limits and thereby provides a more comfortable ride to the driver or passenger occupying seat 12.

The seat 12 includes a mechanical multibar linkage 14 with first and second links 21 and 22 shown in FIGS. 1a–c. The linkage is shown in FIGS. 1a–c is shown in two-dimensions for illustrative purpose, and it should be understood that the linkage includes additional members not shown in the Figures. The linkage 14 is exemplary and it should also be understood that the linkage may be comprised of any suitable means for movably joining the seat and suspension system. The links 21 and 22 include respective fixed location ends 15 and 16 typically rotatably fixed at the back of the seat, and linearly moveable ends 17 and 18 at the front of the seat. See FIGS. 1a–1c. The linearly movable ends of links move in a fixed linear path or track 23 and 24 and the rotatable ends 15 and 16 are fixed by a conventional connection that permits the ends 15 and 16 to be rotatable displaced. A pivotal connection 20 joins the links 21 and 22 and other members (not shown) comprising the linkage 14. The mechanical linkage is of conventional design well known to one skilled in the art and therefore further description of the linkage is not required.

A spring 60 is conventionally coupled to the mechanical linkage 14 at a suitable location and the spring serves to adjust the leveled height of the seat. The spring may be any suitable well known spring such as a mechanical coil spring or an air spring. The leveled seat height is the height that the seat assumes when it is unaffected or substantially unaffected by vibratory disturbances. The leveled seat height is selected by the rider for comfort, ease of reaching vehicle controls such as the steering wheel, brake, clutch and throttle pedal and also personal preference dictates the ultimate leveled seat height. The leveled height is controlled by increasing or decreasing the force supplied by spring 60 by respectively decreasing or increasing the spring height. The change in height may be effected in a number of ways such as by mechanically adjusting the coil spring endpoints or by releasing air from or introducing air into the air spring.

A conventional position sensor 30 is connected to link 21 and serves to sense the position of the link 21, and the position sensor is electrically connected to controller 70 which in turn is connected to conventional magnetorheological (MR) damper 40. The damper 40 is connected to link 22. The damper 40 may contain any suitable field responsive material including magnetorheological (MR) fluid as indicated. The damper serves to control the displacement of the seat during operation. The electrical signals are supplied to the damper during system operation to provide damping sufficient to prevent the system from reaching the maximum and minimum endstop limits. The damper 40 may be comprised of any suitable controllable damper such as a servo valve controlled damper for example.

A conventional microprocessor based controller 70 for processing the sensor signals and actuating the method of the present invention may be located in the same control housing as sensor 30 as shown in FIGS. 1a, 1b, and 1c. The controller is electrically connected to the memory 50. However the controller and sensor may be discrete components that are not collocated in the same housing. The control method of the present invention operates using conventional microprocessor based technology well known to one skilled in the art and therefore further detailed description of the microprocessor technology is not required.

The damper 40 serves to control the displacement of the seat during operation. The electrical signals are supplied to the damper during system operation to provide damping sufficient to prevent the system from reaching the maximum and minimum endstop limits 90 and 91.

Now turning to the control method of the present invention shown in FIGS. 2–5, the method provides a means for varying the gain applied to a damper control signal based on operating conditions. In this way, the method of the present invention serves to limit endstop collisions when the system inputs are greater than typical inputs and also when a person of greater than average weight is occupying seat 12. The method of the present invention can be integrated into a well-known seat suspension control routine that controls typical inputs and riders of average weights. For example, the method of the present invention could be integrated into the routine disclosed in U.S. Pat. No. 5,276,622 for "System for Reducing Suspension Endstop Collisions". In this way, a prior art control routine that includes the method of the present invention would provide damping control over a wider range of system inputs and rider weights.

Figure 3:
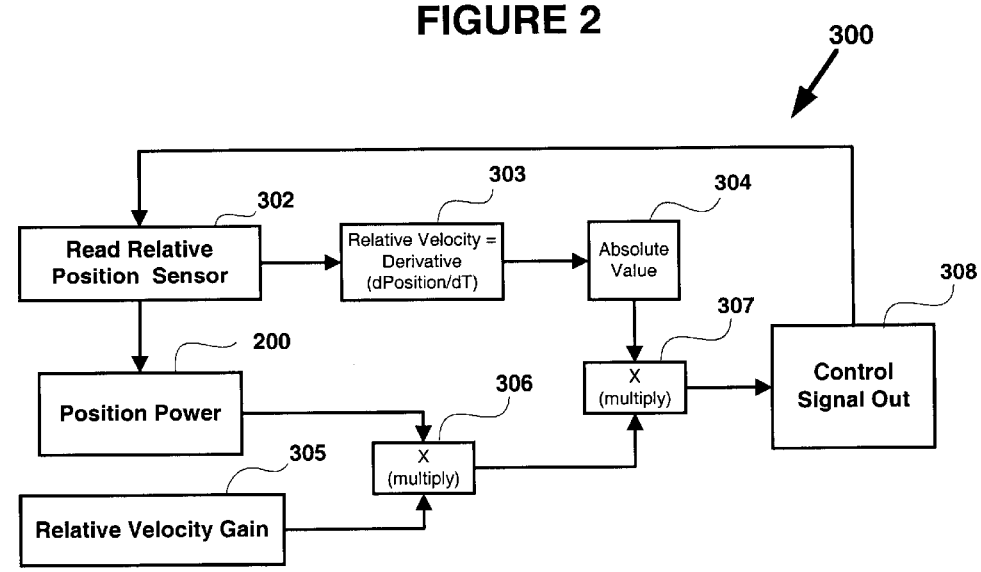
FIG. 3 is a schematic representation of how the calculated positional power value is used to scale the control signal.

As shown in FIG. 3, the control method produces control signal 308 that is the product of a position power value 200, velocity gain 305 and the absolute relative velocity of the seat 304. In Step 302 of routine 300 the value of the relative seat position is obtained from sensor 30 and the change in relative position of the seat 12 over time is calculated in Step 303. The value calculated in Step 303 represents the relative seat velocity. The absolute velocity of the relative seat velocity is taken in Step 304. In Step 307 of routine 300 the absolute value of the seat velocity is multiplied by the product of position power calculated in Routine 200 and the relative velocity gain 305. Steps 200 and 305 will be described in greater detail hereinbelow.

Figure 2:
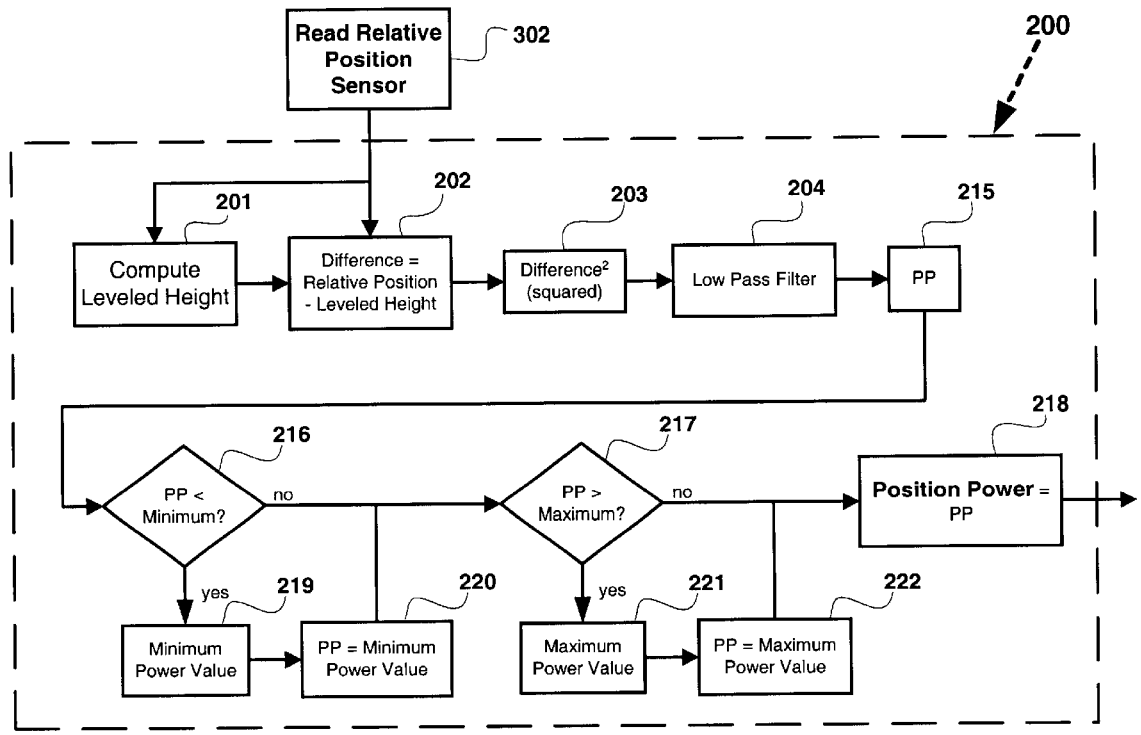
FIG. 2 is a schematic representation of the method for calculating the positional power value for a given seat height.

Specifically, turning to FIG. 2, the positional power which is a function of the seat movement is calculated in the manner shown schematically in routine 200. In Step 201 the leveled seat height or simply leveled height is computed. The leveled seat height value is stored in controller memory 50 and approximates the height of the suspended seat 12 with the rider sitting in the seat and without system vibratory input. The leveled seat height is set by the seat occupant at the height that allows for easy access to the steering wheel, clutch and brake pedals, and the shifter knob, personal preference etc. During operation the leveled seat height may be computed in Step 201 using any suitable well known digital or analog low pass filtering technique.

In Step 202 the value of the leveled seat height is subtracted from the present relative seat position obtained from sensor 30 in Step 302. The relative seat height is the distance between the seat top and the floor of the bus, truck or other vehicle, and the relative seat position moves during use. The difference between the relative seat position and the leveled seat height calculated in Step 202 is squared in Step 203. Although squaring the difference obtained in Step 202 is disclosed, it should be understood that the difference could be raised to any suitable power in Step 203.

The squared difference is transmitted to a low pass filter in Step 204. The filter Step 204 is represented in the flowchart representation of FIG. 4. The squared difference passed through the conventional low pass filter initially comprises a signal 100 of varying amplitudes as shown schematically as the input to FIG. 4. The filtering Step 204 serves to smooth or flatten the variable amplitude control signal 100 so that it more closely represents a DC-like signal. The low pass filter may be any suitable means for filtering specific nonrequired signal frequencies from the signal. Other types of low pass filters may be used and such filters are known to one skilled in the relevant art and therefore further descriptions of such other types of low pass filters are not required.

Figure 4:
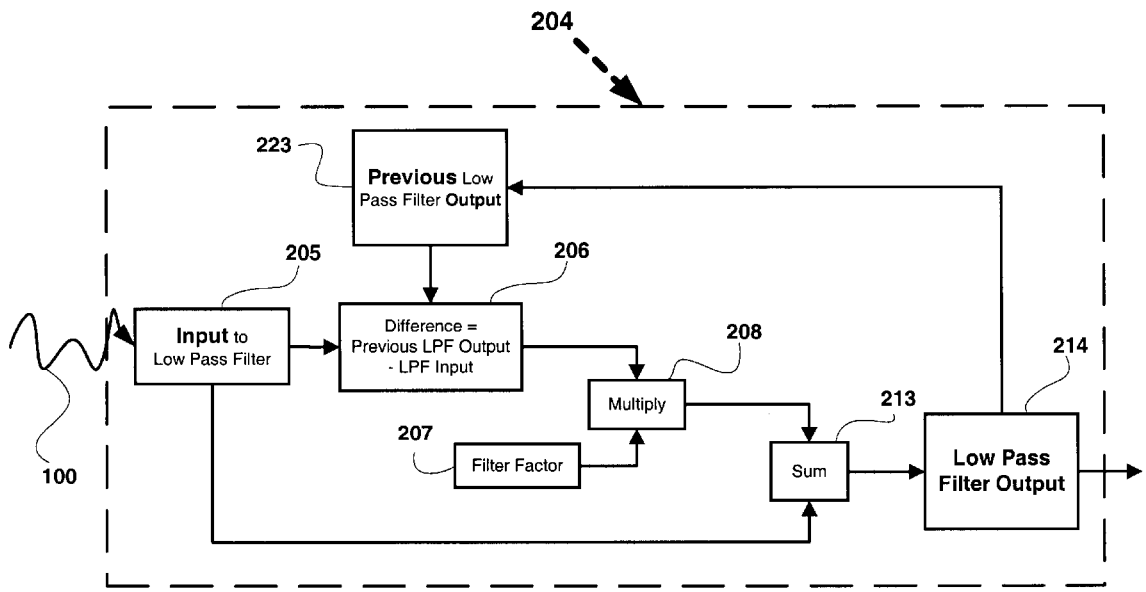
FIG. 4 is a schematic representation of a low pass filter that is used to smooth the calculated positional power signal.

Returning now to the description of the present low pass filter of the present invention, the low pass filtering Step 204 is shown in greater schematic detail in FIG. 4. In Step 205 the signal calculated in Step 203 is passed to the filtering routine 204. Routine 204 stores the previous low pass filter output value in Step 223 and in Step 206 the difference between the previous low pass filter output and the input signal of Step 205 is calculated.

Figure 5:
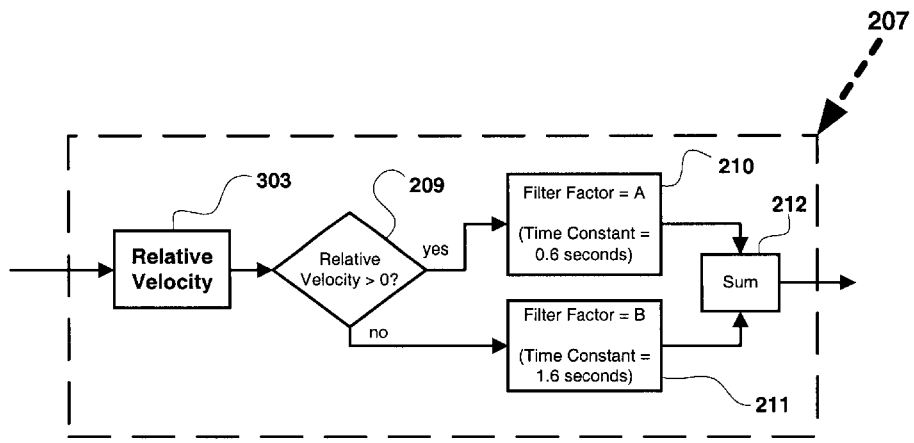
FIG. 5 is a detailed schematic representation of the low pass filter of FIG. 4.

In Step 208 the difference calculated in Step 206 is multiplied by a filter factor determined in Step 207. The routine of Step 207 is illustrated in greater detail in the flowchart representation of Step 207 in FIG. 5. Turning to FIG. 5, the relative velocity calculated in Step 303 is utilized in Routine 207. In Step 209 a determination is made if the relative velocity value is greater than zero. If the relative velocity is greater than zero and therefore is increasing, in Step 210 the method selects a first filter factor identified as A in Step 210. The first selected filter factor provides a time constant equal to 0.6 sec. If the relative velocity is not greater than zero and is therefore decreasing, the method selects a second filter factor identified as B in Step 211. The second selected filter factor provides a time constant equal to 1.6 sec. The first and second time constants may be equal to any suitable values for a particular application. Proper selection of the filter constants is critical to proper functioning of the method of the present invention. The time constant represents the time required to reach 67% of a step change to input in Step 205. Although variable time constants are shown and described in the preferred embodiment of the invention it should be understood that the time constant could comprise a single constant value that is applied regardless of an increase or decrease in seat velocity.

The filter factors are summed in Step 212, and the filter factor is used in Step 207 of Routine 204. In Step 208, the filter factor 212 is multiplied by low pass filter output difference of Step 206, and in Step 213 the product of Step 208 and the Step 205 inputs to the low pass filter are summed. The summed value of Step 213 is sent to routine 200 and is the current position power value in Step 215. This intermediate or current position power may be referred to herein by the abbreviation PP.

Steps 216 and 217 of the current method ensure that the calculated position power value does not exceed the upper and lower limits before the calculated position power value is supplied to the main control algorithm 300 to adjust the gain and ultimately the control signal to be sent to damper 40. By Steps 216 and 217 of the method of the present invention, the control signal will never be reduced to zero or will not get undesirably large. In Step 216 the routine determines if the current PP value is less than the predetermined minimum value 219 for position power. If the current value of PP is greater than the minimum position power value, then the routine proceeds to Step 217 wherein it is determined if the PP value is greater than a predetermined maximum value 221 for position power. If the current value of PP is not greater than the predetermined maximum position power value, the routine proceeds to Step 218 wherein the value of position power is set equal to the current value of PP.

If in Step 216 it is determined that the current PP value is less than the minimum predetermined position power 219 value stored in memory 50, then the minimum position power value is obtained from memory is Step 219 and then in Step 220 the current value of PP is set equal to the predetermined minimum position power value. If in Step 217 it is determined that the current PP value is greater than the maximum predetermined position power value 221 stored in memory 50, then the maximum position power value is obtained from memory is Step 221 and then in Step 222 the current value of PP is set equal to the predetermined maximum position power value. Then the current value of PP calculated in either Step 220 or 222 is set equal to the final Position Power in Step 218 and this value used as the Position Power value in routine 300.

The PP value calculated by routine 200 is supplied to the main control routine 300 in Step 218. The calculated PP value is then used to scale the control signal gain. The relative velocity gain value is a constant that is stored in memory 50. In Step 306, the gain factor retrieved in Step 305 is multiplied with the PP value of Step 218 and then in Step 307 the product of Step 306 is in turn multiplied by the absolute value of the relative seat velocity taken in Step 304. The product of Step 307 is then either sent to control damper 40 or may be sent to a main control algorithm where signal 308 could be combined with with other control signal components before the control signal is sent to the damper 40.

Thus by the control method of the present invention the deviation from the leveled seat height is used to scale the gain factor and adjust the damping force to limit endstop collisions and maintain rider comfort.

While I have illustrated and described a preferred embodiment of my invention, it should be understood that this is capable of modification, and I therefore do not wish to be limited to the precise details set forth, but desire to avail myself of such changes and alterations as fall within the purview of the following claims.

I claim:

1. In a seat suspension system having a means for sensing the relative seat position of the seat and means for controlling the movement of the seat, a method for controlling the movement of the seat, the method comprising the steps of: (a) obtaining a leveled seat height; (b) obtaining a relative seat position from the sensing means; (c) determining the difference between the leveled seat height and the relative seat position; (d) calculating a position power value based on the difference calculated in step (c); (e) determining the relative seat velocity; (f) multiplying the position power value with a gain factor; and (g) multiplying the value of step (f) with the relative seat velocity to obtain a control signal.

2. The method as claimed in claim 1 wherein the method comprises the further step of squaring the difference determined in step (c) before step (d).

3. The method as claimed in claim 2 wherein the squared difference determined in step (c) is passed through a low pass filter.

4. The method as claimed in claim 3 wherein the method comprises the further steps of determining if the relative velocity of the seat is greater than zero.

5. The method as claimed in claim 4 wherein if the relative seat velocity is greater than zero, the method comprising the additional step of setting a first filter factor equal to a value.

6. The method as claimed in claim 5 wherein a first time constant is set equal to approximately 0.6 sec.

7. The method as claimed in claim 4 wherein if the relative seat velocity is not greater than zero, the method comprising the additional step of setting a second filter factor equal to a value.

8. The method as claimed in claim 7 wherein a second time constant is set equal to approximately 1.6 sec.

9. The method as claimed in claim 3 wherein the output of the low pass filter is set equal to the current position power value.

10. The method of claim 3 comprising the additional step of determining if the current position power value is less than a predetermined minimum position power value.

11. The method of claim 3 comprising the additional step of determining if the current position power is greater than a predetermined maximum position power.

12. The method as claimed in claim 10 wherein if the current position power is less than a predetermined minimum position power, the method comprising the additional step of setting the current position power equal to the predetermined minimum position power.

13. The method as claimed in claim 11 wherein if the current position power is greater than a predetermined maximum position power, the method comprising the additional step of setting the current position power equal to the predetermined maximum position power.

* * * * *